United States Patent
Pemble et al.

(10) Patent No.: US 7,502,686 B1
(45) Date of Patent: Mar. 10, 2009

(54) SYSTEM AND METHOD UTILIZING NON-GPS SATELLITE CONTENT IN REAL-TIME NAVIGATION

(75) Inventors: Clifton A. Pemble, Olathe, KS (US); Michael R. Wiegers, Paola, KS (US)

(73) Assignee: Garmin Ltd. (KY)

( * ) Notice: Subject to any disclaimer, the term of this patent is extended or adjusted under 35 U.S.C. 154(b) by 626 days.

(21) Appl. No.: 10/874,823

(22) Filed: Jun. 23, 2004

(51) Int. Cl.
*G01C 21/00* (2006.01)
*G06F 19/00* (2006.01)

(52) U.S. Cl. .................. 701/213; 701/201; 340/995.13; 455/414.2

(58) Field of Classification Search ................. 701/201, 701/202, 207, 208, 209, 210, 211, 213; 340/995.13–995.27; 455/414.2, 414.3, 456.1, 455/456.2, 456.3
See application file for complete search history.

(56) References Cited

U.S. PATENT DOCUMENTS

| | | | | |
|---|---|---|---|---|
| 5,629,804 A * | 5/1997 | Tomono | ...................... | 359/576 |
| 5,689,252 A * | 11/1997 | Ayanoglu et al. | ........... | 340/991 |
| 5,911,773 A * | 6/1999 | Mutsuga et al. | ............. | 701/200 |
| 5,933,100 A * | 8/1999 | Golding | ................. | 340/995.13 |
| 6,014,569 A * | 1/2000 | Bottum | ....................... | 455/466 |
| 6,222,485 B1 * | 4/2001 | Walters et al. | ......... | 342/357.13 |
| 6,266,614 B1 * | 7/2001 | Alumbaugh | ................. | 701/211 |
| 6,324,592 B1 * | 11/2001 | Hindman | ........................ | 710/3 |
| 6,505,121 B1 * | 1/2003 | Russell | ........................ | 701/213 |
| 6,643,581 B2 * | 11/2003 | Ooishi | ........................ | 701/207 |
| 6,738,711 B2 * | 5/2004 | Ohmura et al. | ............. | 701/208 |
| 6,865,480 B2 * | 3/2005 | Wong | ........................ | 701/210 |
| 6,907,344 B2 * | 6/2005 | Nakagawa | ................... | 701/200 |
| 6,929,475 B1 * | 8/2005 | Dragan | ........................ | 433/89 |
| 6,963,799 B2 * | 11/2005 | Kita et al. | .................... | 701/117 |
| 7,062,379 B2 * | 6/2006 | Videtich | ...................... | 701/210 |
| 2001/0001848 A1 * | 5/2001 | Oshizawa et al. | ........... | 701/210 |
| 2002/0173908 A1 * | 11/2002 | Sakamoto | .................... | 701/211 |
| 2003/0074135 A1 * | 4/2003 | Watanabe et al. | ........... | 701/209 |
| 2003/0139150 A1 * | 7/2003 | Rodriguez et al. | ............ | 455/90 |
| 2003/0216846 A1 * | 11/2003 | Chang | ......................... | 701/36 |
| 2003/0229446 A1 | 12/2003 | Boscamp et al. | | |
| 2004/0030489 A1 * | 2/2004 | Huang et al. | ................. | 701/117 |
| 2005/0027449 A1 * | 2/2005 | Marsh | ......................... | 701/213 |
| 2005/0049785 A1 * | 3/2005 | Vergin | ......................... | 701/209 |
| 2005/0099322 A1 * | 5/2005 | Wainfan et al. | ........ | 340/995.13 |
| 2005/0102102 A1 * | 5/2005 | Linn | ......................... | 701/210 |
| 2005/0283311 A1 * | 12/2005 | Ohler | ......................... | 701/209 |
| 2006/0094443 A1 * | 5/2006 | Dowling et al. | ........... | 455/456.1 |
| 2006/0105708 A1 * | 5/2006 | Maeda et al. | ............... | 455/12.1 |
| 2006/0122925 A1 * | 6/2006 | Wesby | ......................... | 705/35 |

\* cited by examiner

*Primary Examiner*—Tan Q Nguyen
(74) *Attorney, Agent, or Firm*—Samuel M. Korte

(57) ABSTRACT

A navigation device is provided that includes a GPS input that receives GPS information from a GPS satellite. The system also includes a non-GPS input that receives real-time content from a non-GPS source. The real-time content includes updates to travel conditions. The system also includes a navigation module that analyses the updates from the non-GPS source in conjunction with the GPS information form the GPS satellite.

14 Claims, 5 Drawing Sheets

SYSTEM AND METHOD UTILIZING NON-GPS SATELLITE CONTENT IN REAL-TIME NAVIGATION

BACKGROUND OF THE INVENTION

The present invention relates to real-time navigation and more specifically to utilizing non-GPS information to update navigation information in real-time.

Navigation devices exist today that utilize GPS information to track the location of the navigation device and thus the device's user. Existing navigation devices typically store a cartographic map of data indicative of a roadway network for a geographic area and offer various applications and features to support the user's navigation through the geographic area. One exemplary application is to provide the user with audio instructions to direct the user between source and destination locations within the roadway network. Various routing parameters exist upon which the route through the roadway network may be based, such as time, distance and the like.

However, the data stored in the navigation device that is indicative of the roadway network is static in that the data is representative of the status of the roadway network only as of the last time that the navigation device was uploaded with a new cartographic map of the roadway network. The cartographic map reflects limited non-periodic or non-reoccurring information regarding the status of the roadway network. For example, while the cartographic map may store data identifying road segments that typically exhibit slow travel times (e.g. due to numerous traffic lights, rough road conditions and the like), the data is unable to identify for non-reoccurring, one time events that impact travel over the roadway network. Examples of non-reoccurring events are traffic accidents, icy road conditions, flooded roads, construction, weather conditions, temporary traffic back-ups and the like.

Heretofore, travelers generally obtained information regarding these non-reoccurring events through the automobile's FM/AM radio that played various types of content, such as entertainment-related content, traffic-related content and the like. To obtain travel-related content, drivers tuned to a weather channel or traffic channel to hear local travel conditions.

No system exists that is able to utilize real-time travel-related content to update navigation information and provide updated navigation information to the user.

A need remains for improved navigation devices, modular electronic devices and methods for use thereof that are better suited to inform users of real-time travel-related conditions and to utilize such real-time travel-related conditions to update navigation information.

BRIEF DESCRIPTION OF THE INVENTION

In one embodiment, a navigation device is provided that includes a GPS input that receives GPS information from a GPS satellite. The system also includes a non-GPS input that receives real-time content from a non-GPS source. The real-time content includes updates to travel conditions. The system also includes a navigation module that analyzes the updates from the non-GPS source in conjunction with the GPS information from the GPS satellite.

Optionally, the navigation module may track a location of the navigation device relative to a road segment based on the GPS information. The navigation module may then determine whether the updates concern the road segment. The system may further comprise memory storing a route between source and destination locations within a geographic area where the route comprises at least one road segment. The navigation module may then determine when the updates concern the road segment.

In one embodiment, a modular electronic device is provided that is configured to travel with a user during travel over a roadway network within a geographic area. The device includes a self-contained housing configured to be portable and at least one receiver that receives position information indicative of a position of the device and receives updates in travel conditions associated with the roadway network. The device also includes a control module provided in the housing and joined to the receiver. The control module analyzes the updates and travel conditions and generates travel-related content based on the updates. An output is provided in the housing that communicates with the control module and outputs the travel-related content to inform a user of a change in the travel conditions.

Optionally, the output may be a wireless transmitter held within the housing which transmits the travel-related content locally to a receiver. Alternatively, the output may be a FM transmitter held in the housing that broadcasts the travel-related content locally to an FM receiver, such as in a vehicle.

In an alternative embodiment, a method is provided for performing real-time updates to navigation information. The method includes receiving GPS information from a GPS satellite and receiving real-time content from a GPS source. The real-time content includes updates to travel conditions. The method further includes analyzing updates from the non-GPS source in conjunction with the GPS information from the GPS satellite.

Optionally, the method may include tracking a location of a navigation device relative to a road segment based on the GPS information and determining whether the updates concern the road segment. Optionally, the method may include calculating a route between source and destination locations within a geographic area and identifying changes in the navigation conditions of the route. Optionally, the method may include automatically interleaving entertainment related content and travel-related content based on the updates to the travel conditions and outputting the interleaved entertainment related content and travel-related content.

In accordance with an alternative embodiment, a method is provided for coordinating output of entertainment related content and travel-related content over a common audio output device. The method includes receiving GPS information from a GPS satellite and determining a user position based on the GPS information. The method further includes generating travel-related content based on the user position and receiving entertainment related content from a non-GPS source. The method also includes outputting the entertainment related content and travel-related content interleaved with one another over a common output device.

Optionally, the method may further include converting the entertainment related content to at least one of an audio and visual output that is output over the common output device. Optionally, the entertainment related content received from the non-GPS source may include updates to travel conditions and the method modifies the travel-related content based on the updates.

DETAILED DESCRIPTION OF THE INVENTION

Figure 1:
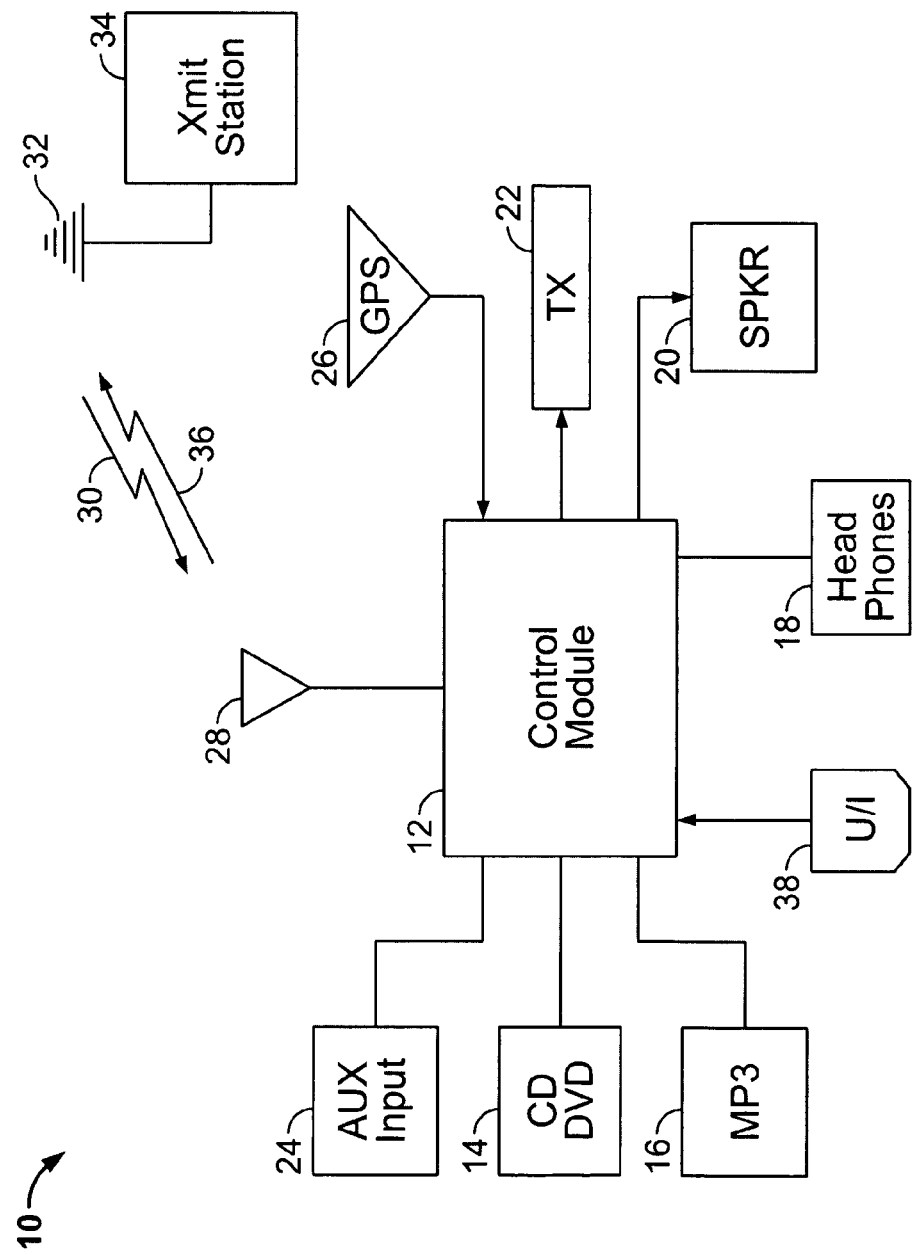
FIG. 1 illustrates a navigation device formed in accordance with an embodiment of the present invention.

FIG. 1 generally illustrates a navigation device 10 formed in accordance with an embodiment of the present invention. The navigation device 10 includes a control module 12 interconnected with a series of peripherals including a CD/DVD player 14, an MP3 player 16, headphones 18, speakers 20, a wireless transmitter 22 and an auxiliary input 24. The control module 12 also is connected to a GPS receiver 26, such as a GPS antenna, and to a non-GPS input or non-GPS receiver 28. The GPS receiver 26 receives GPS information from satellites within the global positioning system. The non-GPS receiver 28 receives real-time content 30 from a transmitter 32 which is in turn driven by a transmission station 34. The transmission station 34 represents a non-GPS source such as an FM transmitter, an AM transmitter, a cellular phone transmitter, a non-GPS satellite and the like. Examples of non-GPS satellites include satellites utilized in connection with military applications, satellites that transmit radio content (such as XM radio), satellites that transmit weather information and the like.

Optionally, the non-GPS receiver 28 may also include a transmitter (thereby forming a transceiver) able to transmit return content 36 such as user status, position information, inquiries, emergency requests, communication signals (e.g., telephone and/or data signals) and the like.

The real-time content 30 received by the receiver 28 may include a variety of content, such as entertainment related content (e.g., music, sporting events, public radio, news, syndicated programs, and the like) and travel-related content (e.g., travel conditions representative of a present or real-time status of a particular road segment within a roadway network of a geographic area). The travel-related content may relate to one or more of the weather, construction, automotive accidents and/or traffic backups due to rush hour and the like. The transmission station 34 combines the entertainment related content in a predefined format to produce the real-time content 30. The travel conditions are continuously updated as new information is received and validated, whereupon updates in the travel conditions are interspersed by the transmission station 34 within the real-time content 30. For example, the travel-related content may be broadcast over a dedicated and preassigned transmission station or channel. Alternatively, the travel-related content may be interspersed within other broadcast channels that also convey entertainment related content.

The control module 12 may offer various navigation functions and features. Similar to the navigation functions and features discussed below in connection with the electronic device 40 of FIG. 2. In addition, the control module 12 identifies, within the real-time content 30, updates to travel conditions and analyzes such updates in conjunction with the GPS information received from the GPS receiver 26. For example, the control module 12 may track a location of the navigation device 10 relative to a roadway segment within a roadway network of a geographic area. The control module 12 tracks the location of the navigation device 10 based on the GPS information and determines whether updates, received within the real-time content 30, concern the particular road segment along which the navigation device 10 is traveling.

The control module 12 may output the travel-related content over the speaker 20 and/or headphones 18, such as through an audio message. Alternatively, the control module 12 may instruct the transmitter 22 to transmit the travel-related content locally over a predefined channel within an operating range of a local receiver. For example, the transmitter 22 may constitute an FM or AM transmitter that transmits real-time travel-related content locally to an FM or AM radio, when the navigation device and FM radio are in close proximity to each other (e.g. less than 100 feet, and preferably less than 25 feet).

The control module 12 may receive audio information from one or more of the auxiliary input 24, the CD/DVD unit 14 and the MP3 player 16. The control module 12 playsback the audio information over the speaker 20 or headphones 18 or transmits the audio information from transmitter 22 to the local receiver. When playing back the audio information, the control module 12 intersperses, within the audio signals, navigation and/or travel-related content. By way of example only, the navigation device 10 may playback audio entertainment information to the driver of a vehicle. When the vehicle approaches an intersection at which the navigation device 10 instructs the driver to turn, the control module 12 interrupts the audio entertainment information and delivers a corresponding audio instruction containing navigation or travel-related content (e.g., "turn right", "turn left", "accident ahead two miles", "thunderstorms reported over Kansas City ahead ten miles" and the like.).

The control module 12 also performs "circumstance routing" which is explained below in more detail in connection with the embodiment of FIG. 2.

Figure 2:
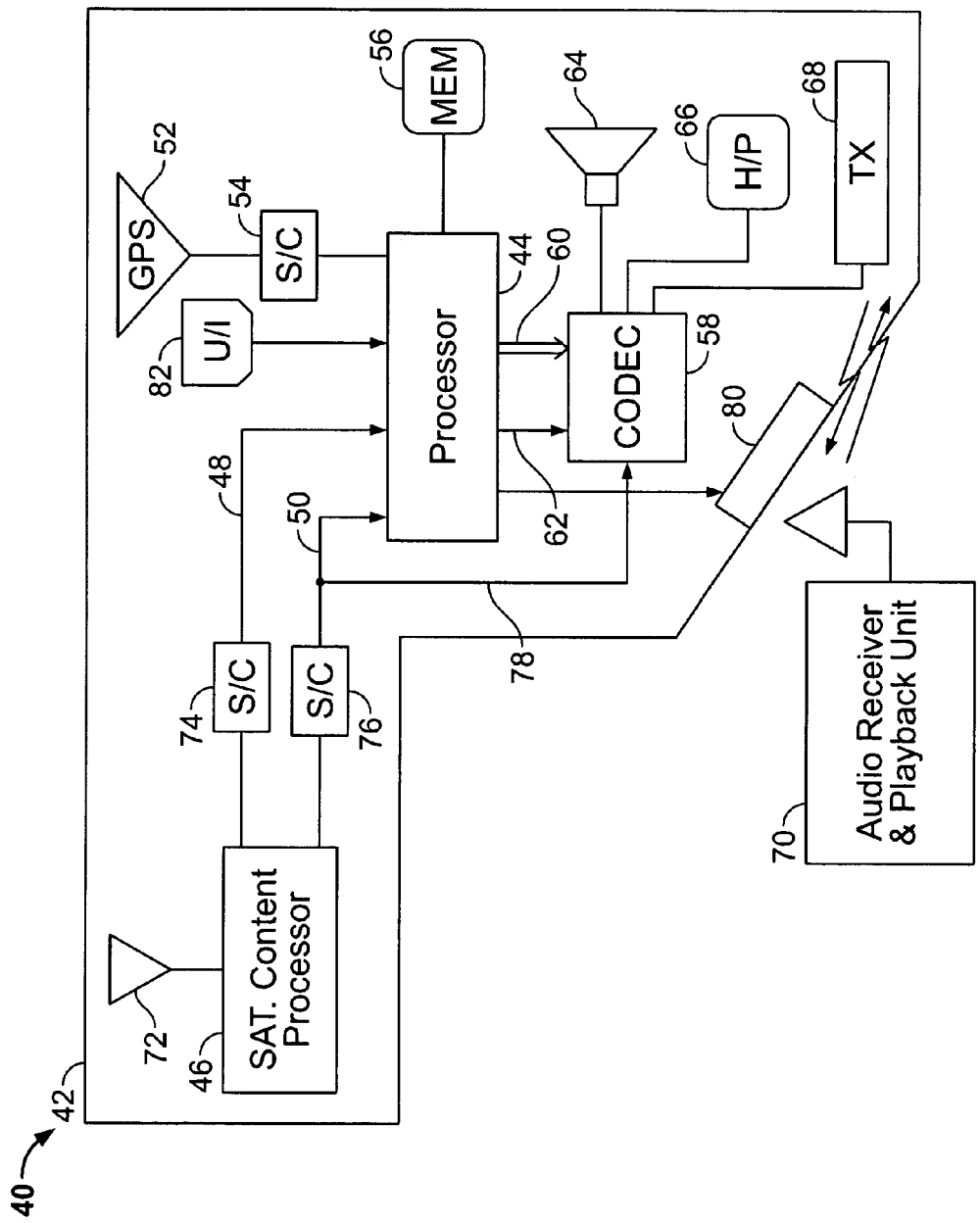
FIG. 2 illustrates a block diagram of an electronic device formed in accordance with an embodiment of the present invention.

FIG. 2 illustrates an electronic device 40 that is modular and configured to be carried with a user during travel over a roadway network within a geographic area. For example, the user may place the electronic device 40 on the dash of an automobile when driving, a boat, an airplane or in a backpack when camping, biking or hiking. The electronic device 40 includes a housing 42 that contains all of the remaining structure of the electronic device 40. The electronic device 40 includes a processor 44 that communicates with a satellite content processor 46 over data lines 48 and 50. The processor 44 communicates with a GPS receiver 52 through signal conditioning circuitry 54 to receive GPS information. Memory 56 in the housing 42 stores, among other things, cartographic map data associated with one or more geographic areas including data indicative of a roadway network comprised of road segments intersecting with one another at nodes within the geographic areas. The processor 44 accesses the cartographic map data in memory 56 in connection with navigation and routing functions. A CODEC 58 is provided within the housing 42 and is interconnected with the processor 44 by data lines 60 and an interrupt line 62. The CODEC 58 converts digital audio signals, received over data lines 60 from the processor 44 into analog signals that drive speaker 64 thereby playing audio information to the user. In addition, the CODEC 58 is attached to headphones 66 which may also be driven by the CODEC to play the audio information.

Optionally, the CODEC 58 maybe connected to a transmitter 68 which modulates the audio information for transmission to a an audio receiver and playback unit 70 (such as an FM receiver within a radio in an automobile). The audio receiver and playback unit 70 is separate and distinct from, and outside of, the housing 42, but in close proximity thereto (e.g., less than 100 feet and preferably less than 25 feet). By way of example, the electronic device 40 and the audio receiver and playback unit 70 may both be located within an automobile, boat, airplane, backpack and/or held by a user.

The satellite content processor 46 is interconnected with a receiver 72 which receives real-time content from a non-GPS satellite. For example, the satellite may constitute a military satellite, a weather satellite or a radio transmission satellite (such as XM radio). The real-time content received by receiver 72 includes entertainment-related content and traffic-related content, among other things. The satellite content processor 46 analyzes the incoming satellite content to identify and separate travel-related content from entertainment-related content. The satellite content processor 46 then conveys separately over data lines 48 and 50, the entertainment content and the travel-related content, respectively. Signal conditioning circuits 74 and 76 process the travel-related content and entertainment-related content, respectively, before passage to the processor 44. The entertainment-related content is also passed along bypass 78 directly to the CODEC 58 for conversion to analog signals and play or transmission.

The processor 44 carries out numerous navigation functions and offers a variety of navigation and routing features. By way of example, the processor 44 may perform point-to-point routing, in which a user first identifies source and destination locations within the roadway network. The processor 44 then calculates a suggested route between the source and destination points based upon parameters defined by the user, such as shortest distance, shortest time or the like. Once the processor 44 determines the initial suggested route between the source and destination points, the processor 44 then monitors the progress of the electronic device 40 along the route between such points. Optionally, the processor 44 may present the routing information on a display 80 and/or provide audio instructions over speaker 64 or headphones 66 to the user. The audio instructions may by way of example include turn information (e.g. "turn right in 100 yards at the next light", "take exit 52 coming up in one mile" and the like).

In addition, the processor 44 performs "circumstance routing" in which the initial suggested route, having already been defined, is changed by the processor 44 based upon traffic-related content received over data line 48. For example, the satellite content received at receiver 72 may include traffic-related content indicating that an accident has occurred along the roadway segment upon which the user is traveling. The traffic-related content may further indicate an amount of delay associated with the accident. The accident information and delay are passed within the traffic-related content over data line 48 and the processor 44 uses such traffic-related content to access whether the initial suggested route remains the best (e.g. fastest or shortest) route to the destination based on the users selected parameters.

The traffic-related content represents real-time information relative to navigation in that the traffic-related content includes non-reoccurring information that will impact the user's travel. Real-time is not limited to "live" information, but instead is intended to broadly refer to any information regarding facts and circumstances that are not reflected in the data of the cartographic map. The facts and circumstances may have arose after the cartographic map was loaded into the electronic device 40, but need not necessarily.

In the event that the processor 44 determines that the initial suggested route is no longer the best route, the processor 44 recalculates the route. The processor 44 informs the user of the traffic-related content (e.g. "an accident has occurred and a delay of x minutes resulted"). The processor 44 may also instruct the user that a new route has been calculated and subsequently provide a user with directions along the new route through display 80, speaker 64 and/or headphone 66.

The CODEC 58 receives digital audio information over bypass 78 representing the entertainment-related content separated by the satellite content processor 46. The CODEC 58 converts the entertainment-related content (originally in a digital format) from bypass 78 to a format compatible with one or more of the speaker 64, headphone 66 and transmitter 68. The processor 44 also utilizes the interrupt 62 to control operation of the CODEC 58. For example, the interrupt 62 is turned on by the processor 44 when the processor 44 desires to output digital audio information related to navigation, routing or traffic-related content over data line 60 to the CODEC 58. When the CODEC 58 detects an interrupt at interrupt line 62, the CODEC 58 suspends play of the entertainment-related content from bypass 78 and outputs the navigation, routing or traffic-related content received over data line 60. When the complete digital audio information is passed over data line 60, the processor 44 turns off the interrupt 62 and the CODEC 58 again processes and outputs the entertainment-related content from bypass 78.

Optionally, the CODEC 58 may fading in and fade out the entertainment content from the bypass 78 to provide a smooth transition within the audio information presented to the user. Optionally, the CODEC 58 may mix the entertainment information and the navigation, routing or travel-related content. For example, the CODEC 58 may reduce the volume of the entertainment-related content to a very background level while playing more loudly the navigation, routing, or travel-related content.

In the embodiments illustrated in FIGS. 1 and 2, speakers 20, 64 and/or headphones 18, 66 are directly connected to and powered by the navigation device 10 and electronic device 40 such that the power sources of each directly drive the speakers 20, 64 or headphones 18, 66. It is understood that the speakers 20, 64 and headphones 18, 66 may be removed entirely and the navigation device 10 and electronic device 40 rely entirely for audio output upon the speaker system built within the automobile or a separate playback unit. In this regard, transmitters 22 and 68 may be configured to transmit over a predetermined FM or AM channel with sufficient power to be received by the FM/AM antenna of the automobile or playback unit. The radio within the automobile or playback unit is then turned to the designated channel and the output information from the navigation device 10 and electronic device 40 are provided over the speakers within the automobile or playback unit. The user is able to leave the radio tuned to the predetermined channel at all times and rely entirely on the navigation device 10 or electronic device 40 to provide all entertainment-related content, as well as navigation, routing and travel-related content. The user is able to select particular entertainment-related content (e.g. channels and the like through the user interface 38 in navigation device 10 and through the interface 82 in the electronic device 40).

Optionally, a single antenna system may be utilized combining the functionality of the receiver 72 and GPS receiver 52 into a common smart antenna. The common antenna would have the ability to receive non-GPS satellite information, such as from subscription data services (e.g. XM radio and the like). The smart antenna would further be able to receive GPS information, as well as other non-satellite based transmissions such as AM, FM and other RF based transmissions. The received information may be coded in a variety of formats including frequency division multiple access (FDMA), code division multiple access (CDMA), blue tooth enabled, Wi-Fi enabled and the like. The smart antenna may encompass a processor to perform initial processing and separation of incoming transmissions and output one or more streams of data, entertainment-related content, position information, weather and traffic-related content.

Figure 3:
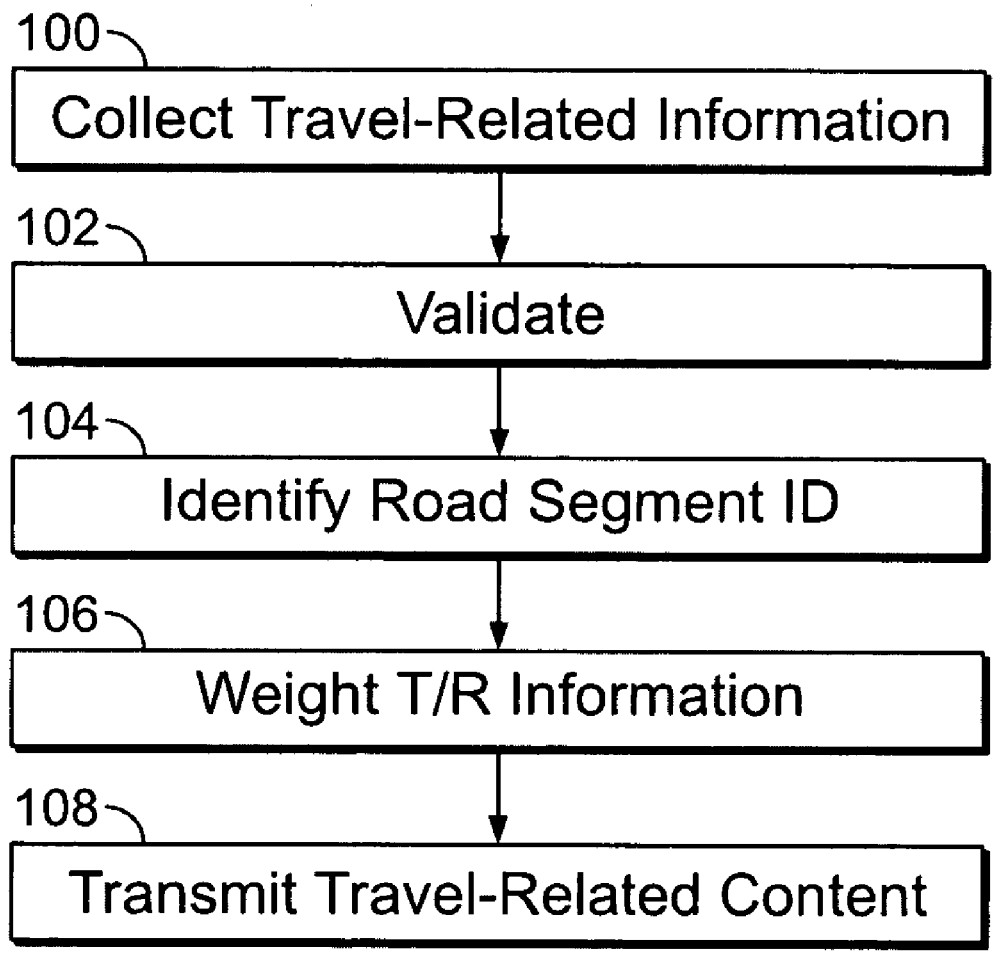
FIG. 3 illustrates a flow chart setting forth the steps that may be implemented in accordance with one embodiment to generate travel-related content.

FIG. 3 illustrates an exemplary flow chart of the process carried out by a remote transmission service, such as a subscription data service. The process set forth in FIG. 3 may be carried out at the transmission station 34 illustrated in FIG. 1 or remote therefrom. In the example of FIG. 1, the transmission station 34 directly communicates via transmitter 32 to the receiver 28 of the navigation device 10. It is understood that the transmission station 34 is intended to very broadly represent stations that may be land based, aircraft based, ship based, satellite based and the like. For example, the transmission station 34 may represent a low earth, medium earth or high earth orbit satellite that communicates via transmitter 32 through line of site communications with receiver 28. Alternatively, the transmission station 34 may represent a relay tower located in a metropolitan area or in a rural area to relay various types of content.

Returning to FIG. 3, at the transmission station 34 or upstream thereof, travel-related information is collected (step 100) from a variety of sources throughout a geographic area. The travel-related information is then validated, such as by a secondary source of similar information and/or by confirming that the travel-related information relates to a valid road segment within a roadway network within a corresponding geographic area. Once the traffic-related information is validated (step 102) the road segment is uniquely identified (step 104) within the roadway network such as based on the newest modes of the road segment on either side of the location associated with the travel-related information. Each road segment has unique identification data stored within the cartographic maps in the memory within control module 12 in FIG. 1 and memory 56 within electronic device 40 in FIG. 2. Once a road segment ID is determined, the traffic-related information is assigned a weight (step 106) based upon parameters utilized for navigation and routing within the cartographic map. The weight may constitute a number along a normalized scale, a number of minutes, a general ranking and the like. Once the traffic-related information is assigned a weight at step 106, the weight, road segment ID and traffic-related information are combined and formatted as traffic-related content which is transmitted at step 108 from the transmitter 32 (FIG. 1). Optionally, the traffic-related content may be transmitted over a dedicated channel or station. Alternatively, the traffic-related content may be embedded within entertainment content transmitted over one or more non-dedicated stations or channels.

Figure 4:
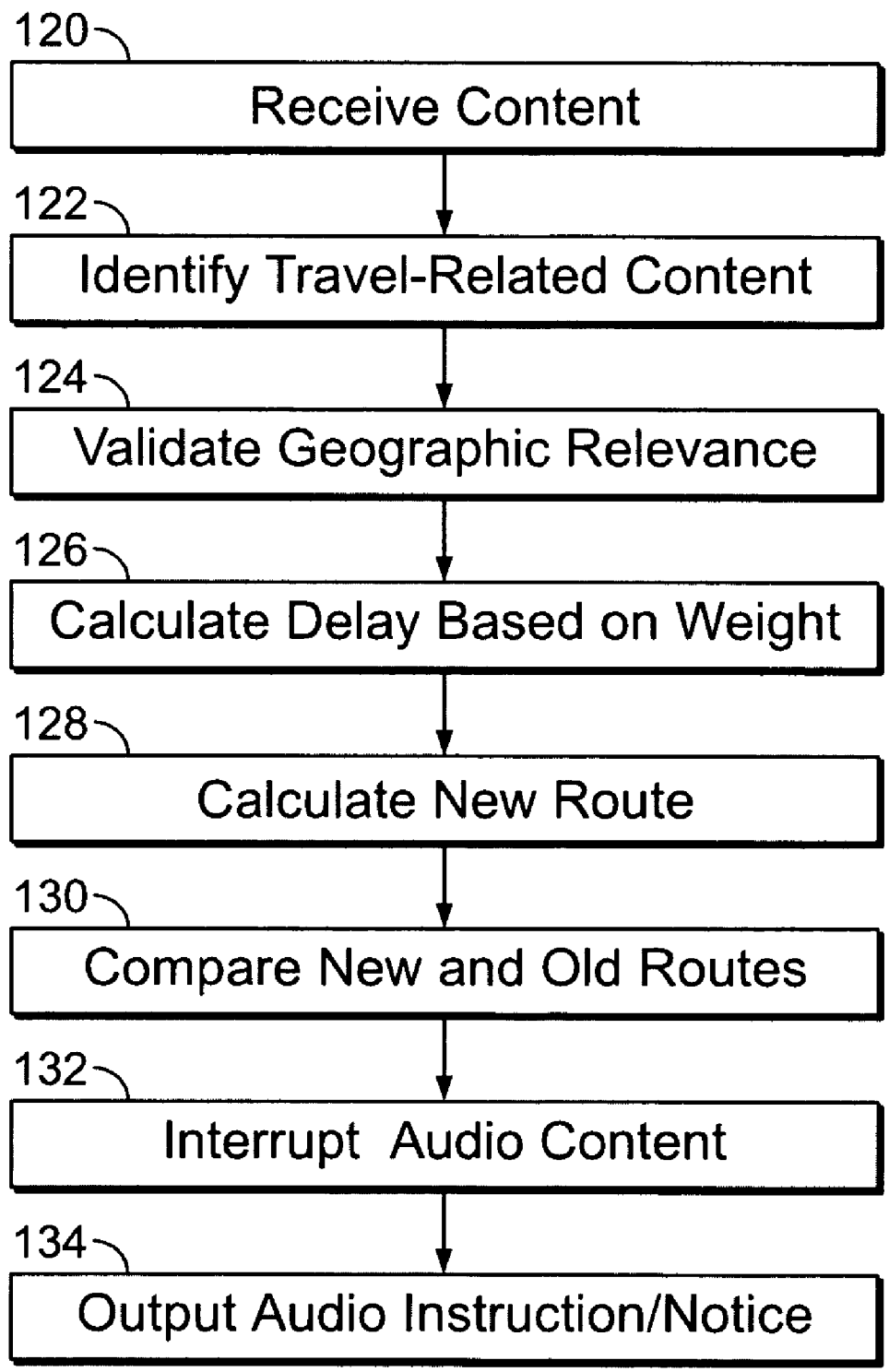
FIG. 4 illustrates a method carried out in accordance with at least one embodiment for providing real-time updates to navigation information.

FIG. 4 illustrates a processing sequence carried out by the navigation device 10 and/or the electronic device 40 in connection with circumstance routing. At step 120, the receiver 28, 72 receives real-time content from a remote transmitter. Within the content, travel-related content is identified at step 122. In the electronic device 40, the satellite content processor 40 performs the identification at step 122. Next, at step 124, the traffic-related content is analyzed to determine the road segment to which the traffic-related content pertains and it is determined whether the traffic-related content has geographic relevance. Geographic relevance exists when the road segment ID within the traffic-related content corresponds to a road segment along which the user is presently traveling. Alternatively, or in addition, geographic relevance may exist when the traffic-related content relates to a road segment within a suggested route along which the navigation device 10 or electronic device 40 is presently directing the user. For example, if a suggested route includes a road segment along which a traffic accident has occurred and the travel-related content identifies the traffic accident, then geographic relevance would exist.

When the traffic-related content is relevant to a road segment along which the user is presently traveling or expected to travel in the near future, control passes to step 126 at which a delay is calculated based on the weight assigned to the traffic-related content. At step 128, a new route is calculated from the user's present position to the destination where the new route utilizes the updated weight information associated with the identified road segment. At step 130, the new and old routes are compared to determine which is preferable based on the user selected parameters (e.g. faster, shorter, etc.).

At step 132, the audio content being played back to the user (e.g. the entertainment-related content played over the radio) is interrupted and an initial suggested traffic-related message is presented to the user. When a new route is determined to be better than the initial suggested route, the traffic message may inform the user that a new route is preferable in view of the traffic-related content. At step 134, the navigation, routing and/or traffic-related content is output audibly to the user.

Figure 5:
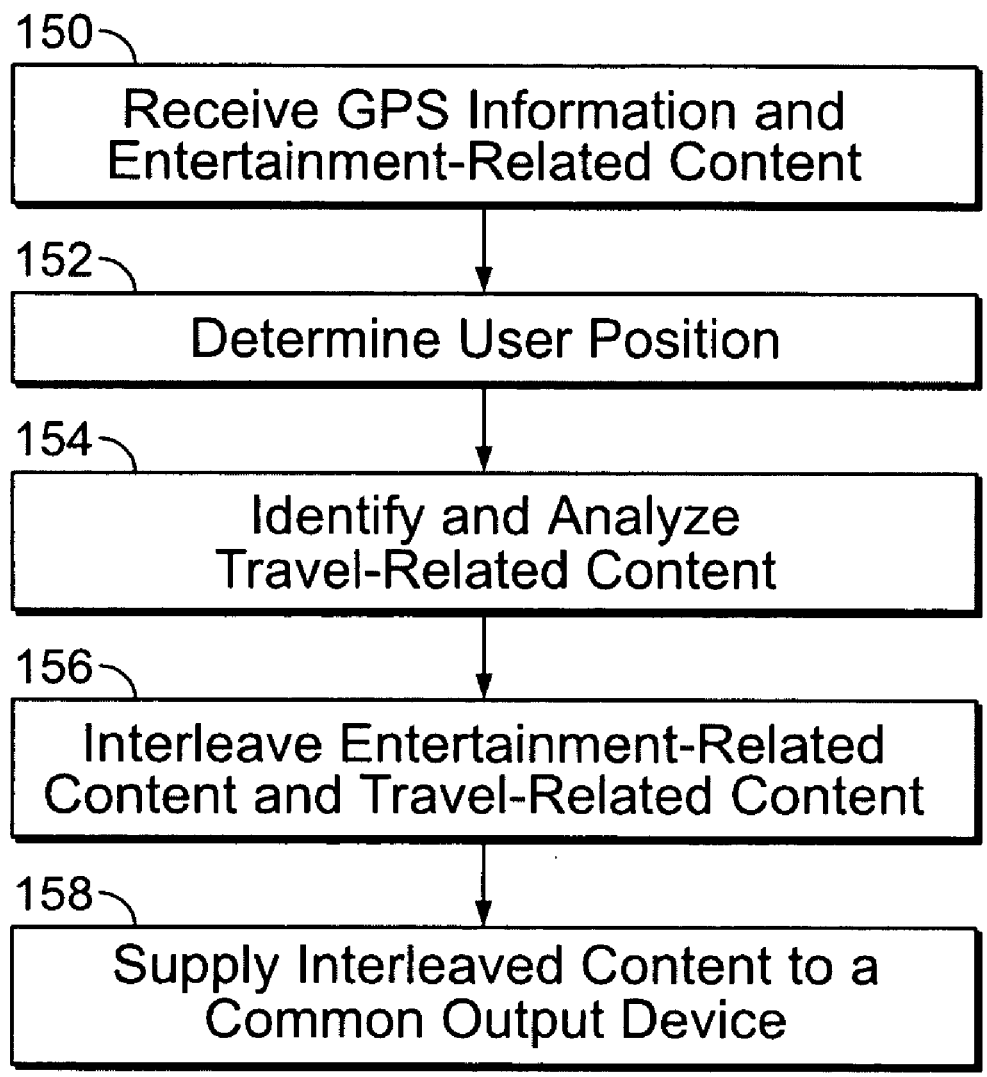
FIG. 5 illustrates a method carried out in accordance with an embodiment of the present invention for coordinating the output of entertainment related content and travel-related content over a common output device.

FIG. 5 illustrates an alternative embodiment in which the electronic device 40 performs circumstance routing without an initial suggested route between source and destination locations. In the example of FIG. 5, the electronic device 40 receives GPS information and entertainment content at step 150. At step 152, the user position is determined. At step 154, the travel-related content is identified and analyzed for relevance to a road segment associated with the user's present position. The road segment may be the road segment upon which the user is presently traveling. Alternatively, the road segment may be ahead of, or in close proximity to, the road segment upon which the user is presently traveling. At step 156, the entertainment content and the travel-related content are combined and, at step 158, both are supplied to a common output device. The output device may constitute an audio receiver and playback unit 70 (FIG. 2), the radio within a car, a portable "boom box", a handheld FM/AM radio a home stereo and the like. The common output device may simply constitute a speaker within the electronic device 40 configured as a stand alone unit.

Returning to step 156, when the entertainment related content and travel-related content are interleaved, both may, but need not, be played back at the same time. Instead, the entertainment related content may be played back until travel-related content is identified to be relevant to the user. When travel-related content is identified to be relevant to the user, the entertainment related content is suspended, faded out or reduced in volume while the travel-related content is played.

In one exemplary embodiment, a commute watch feature may be offered in which the user preprograms a day to day commute between home and work. Each morning and evening the user selects the commute watch feature. Upon start-up, the navigation system 10 or electronic device 40, initially determines whether the normal commuting route is experiencing delays sufficient to warrant taking an alternative path. The user may be informed of an overall length for the commute and/or the amount of delay in excess of the normal commute time. The user may also be informed of the location of the delay, the cause of the delay and the estimated time before traffic returns to normal. In the event that multiple routes exist between home and work (e.g., two interstates, three main highways, etc.), the user may be informed at startup of the best/fastest route. The navigation device 10 and the electronic device 40 track the users progress between work and home and vise versa. In the event that travel-related content is detected that is relevant to a road segment along the commuting route, the user is notified visibly and/or audibly. Optionally, an alternative route may also be calculated and provided to the user.

As explained above, the travel-related content includes weather information. Weather stations collect local data and provide such data to subscription data services (such as XM radio). The subscription service confirms the location of the weather and generates travel-related content identifying road segments and/or a general geographic area impacted by the adverse weather. The severity of the weather is also utilized to assign a weight or provide a severity rating to the weather information within the travel-related content. When the navigation device 10 or electronic device 40 receives the travel-related content, the weighting or cost associated with each road segment than the effected geographic area is increased accordingly.

Optionally, the navigation device 10 or electronic device 40 may utilize the antenna already provided within the automobile and replace of receivers 28 and 72 and/or GPS receivers 26 and 52 (for GPS enabled automobiles). As a further option, the navigation device 10 and electronic device 40 may be interconnected with the CAN bus within an automobile to obtain information related to the operation and performance of the automobile and to output audio signals to the speaker system within the automobile or directly communicate with the audio receiver and playback unit 70 (radio) within the automobile.

While the invention has been described in terms of various specific embodiments, those skilled in the art will recognize that the invention can be practiced with modification within the spirit and scope of the claims.

What is claimed is:

1. A method for coordinating output of entertainment-related content and travel-related content over a common output device, comprising:
    receiving GPS information from a GPS satellite;
    determining a user position based on said GPS information;
    generating travel-related content based on said user position;
    receiving entertainment-related content from a non-GPS source; and
    wirelessly transmitting via radio-frequency signals said entertainment-related content and travel-related content interleaved with one another to an audio playback unit.

2. The method of claim 1, further comprising converting said entertainment-related content to at least one of an audio and visual output that is output to said audio playback unit.

3. The method of claim 1, wherein said entertainment-related content received from the non-GPS source includes updates to travel conditions, said generating modifies said travel-related content based on said updates.

4. The method of claim 1, wherein said entertainment-related content includes updates to travel conditions, said method further comprising analyzing said updates from said non-GPS source in conjunction with said GPS information to obtain modifications to said travel-related content.

5. The method of claim 1, wherein said wirelessly transmitting includes using one of a FM transmitter, an AM transmitter, and a wireless transmitter.

6. A portable navigation device comprising:
    a satellite navigation receiver operable to receive satellite navigation signals and determine a current geographic location of the device using the received satellite navigation signals;
    a satellite content receiver operable to receive entertainment-related content from one or more satellites;
    a processor coupled with the satellite navigation receiver and operable to generate travel-related content based on the current geographic location of the device and interleave the generated travel-related content with the received entertainment-related content to generate an audio signal; and
    a radio-frequency transmitter coupled with the processor and operable to wirelessly transmit a radio-frequency signal corresponding to the generated audio signal for use by an audio playback unit.

7. The navigation device of claim 6, wherein the satellite navigation receiver is a Global Position System (GPS) receiver.

8. The navigation device of claim 6, wherein the satellite content receiver is a satellite radio receiver operable to receive satellite radio signals.

9. The navigation device of claim 6, wherein the satellite content receiver is further operable to receive traffic-related content and the processor is operable to interleave the traffic-related content, the entertainment-related content, and the audio instruction to generate the audio signal.

10. The navigation device of claim 6, wherein the radio-frequency transmitter is one of a FM transmitter, an AM transmitter, and a wireless transmitter.

11. The navigation device of claim 6, wherein the audio playback unit is an in-dash radio system disposed within an automobile.

12. The navigation device of claim 6, wherein the travel-related content and the entertainment-related content are interleaved such that the travel-related content has a greater volume than the entertainment-related content when the audio signal is used by the audio playback unit.

13. The navigation device of claim 6, wherein the entertainment-related content includes music.

14. The navigation device of claim 6, further including a speaker for producing an audible representation of the generated audio signal.

* * * * *